Aug. 19, 1941.   K. LEIMER   2,253,437
HYDRAULIC POT PRESS, WHICH SERVES FOR PRESSING COCOA
BUTTER FROM THE LIQUID COCOA MASS
Filed Aug. 26, 1939
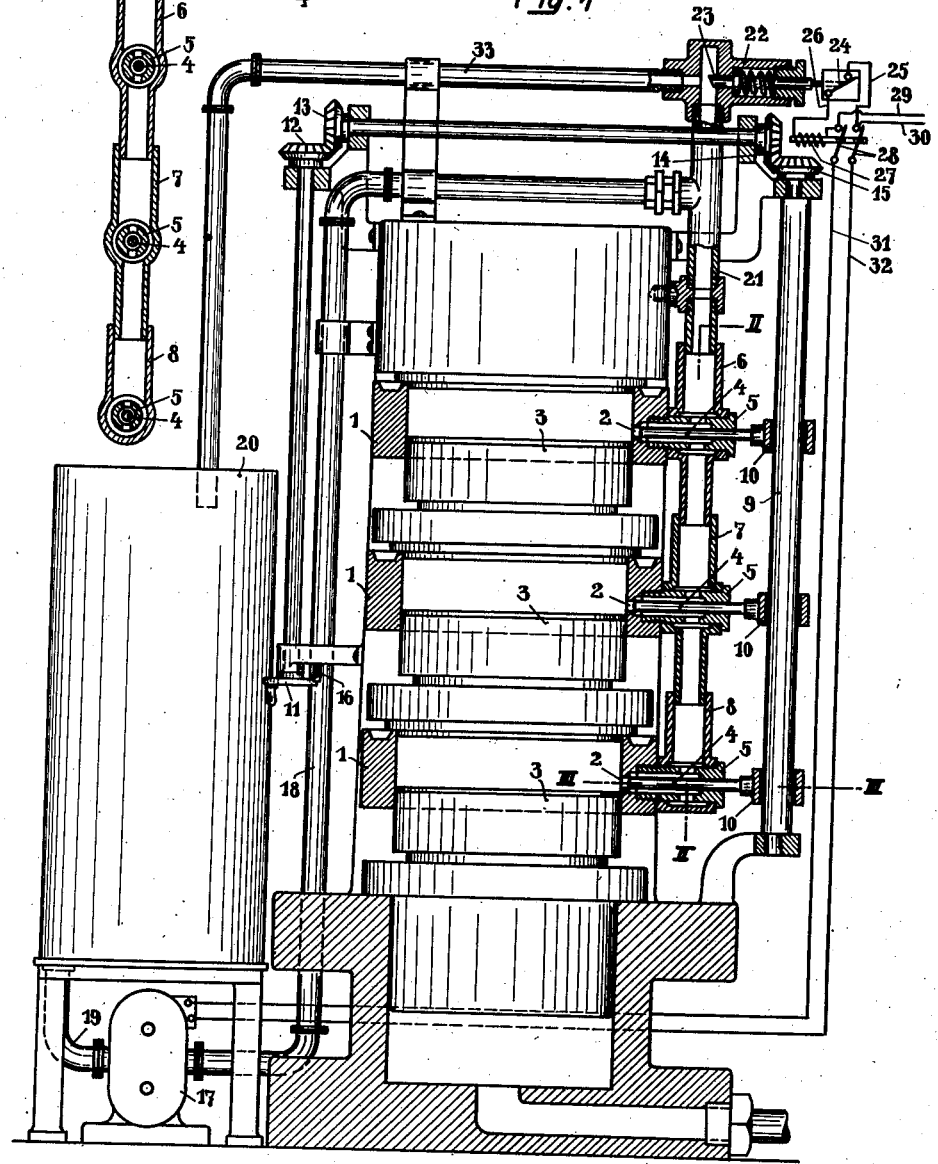
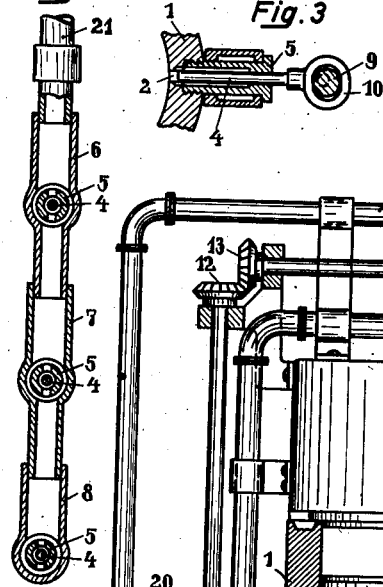
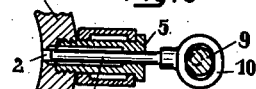
Inventor:
K. Leimer
By C. F. Wenderoth
Atty Patented Aug. 19, 1941

2,253,437

UNITED STATES PATENT OFFICE 2,253,437

HYDRAULIC POT PRESS, WHICH SERVES FOR PRESSING COCOA BUTTER FROM THE LIQUID COCOA MASS

Karl Leimer, Dresden-Zschieren, Germany

Application August 26, 1939, Serial No. 292,129
In Germany September 2, 1938

1 Claim. (Cl. 100—50)

The known hydraulic pot presses, which serve for pressing cocoa butter from the liquid cocoa mass, are mostly so arranged that the separate pots can be swung out from the press or removed on guide rails, in order that they can be filled by hand by means of tubes or by a filling pipe, which is provided with a branch leading to each separate pot and which is fed with liquid cocoa mass by a filling pump. In both cases care must be exercised by the operator in filling all of the pots uniformly up to the brim, as is absolutely necessary.

The invention is concerned with the problem of so arranging the cocoa pot press that the pots are filled purely automatically, while the pots themselves remain in the press, i. e. it is no longer necessary to remove them or swing them aside.

In order to effect the filling of all the pots at the same time, the following arrangement is provided. A filling tube is provided which is connected with a filling pump and is formed of tube parts which are adapted to telescope within one another in the direction of the central axis of the press, and from this filling tube valve controlled pipes lead to the pots of the press.

The valves are all opened or closed at the same time by a shaft, alternately rotatable through 180°, eccentrically mounted and arranged parallel to the central axis of the press, on which shaft the heads of the valve rods slide during the upward and downward movement of the press piston.

Suitably the telescopic filling tube is provided with an excess pressure device closing or opening an electric circuit, by which on the filling of all the press pots being completed the electrically driven filling pump is stopped.

One embodiment of the improved hydraulic pot press is illustrated by way of example in the accompanying drawing, in which Fig. 1 shows the pot press as a whole partly in vertical cross section.

Fig. 2 is a section on the line II—II of Fig. 1.

Fig. 3 is a horizontal cross section on the line III—III of Fig. 1.

Referring to the drawing, each pot 1 of the hydraulic cocoa press is provided with a lateral opening 2 close above the movable bottom 3 of the pot shown in its lowermost position. Each opening is freed during the filling of the pots and is closed after the filling is completed by a valve rod 4 in a valve housing 5, which is screwed into the wall of the pot. The separate valve housings 5 are constructed of parts 6, 7, 8 of a filling tube, the parts being telescopically movable within one another. The filling tube is shortened during the pressure stroke and is lengthened on the downward stroke of the press piston to permit removal of the press cakes.

The opening and closing of all the filling valves at the same time is effected by a shaft 9 arranged parallel to the central axis of the press and mounted eccentrically in the press frame. Each valve rod 4 is formed at its outer end at 10 as a ring and embraces the shaft 9. For opening and closing the filling valves the eccentric shaft 9 is rotated from the attendant's position alternately through 180° by means of the hand wheel 11 through the medium of bevel gearing 12, 13 and 14, 15. It is preferable to provide stops 16 which limit the rotation of the hand wheel 11 to the one side and the other. The electrically driven filling pump 17 with its pressure pipes 18 and its suction pipe 19 takes the liquid cocoa mass from the container 20 and forces it into the upper fixed part 21 of the filling tube. The pump is started from the attendant's position as is the operation of the hand wheel 11. The filling pump 17, however, is stopped automatically. For this purpose the part 21 of the filling tube is provided with an excess pressure device 22, the spring-loaded pressure rod 23 of which is displaced against the action of a spring after the filling of all the pots is completed. The displacement causes the opening of the switch arm 24 of an auxiliary circuit 25, 26 supplied with electric current. This opening effects the opening of a magnetic switch 27, the blades 28 of which cooperate with the current leads 29, 30. In Fig. 1 the switch arms are shown in the contact position, in which the circuit is closed through the leads 31, 32 to the electric filling pump 17 which is driven. As soon as the electro-magnet is switched off, the displacement of its solenoid core causes the rotation of the switch arms 28 from the contact position. The circuit is thus broken and the pump 17 stopped.

It should be noted that any filling mass supplied in excess through the pressure pipe is delivered to a return pipe 33 which is connected with the filling pipe 21 and returns to the container 20.

I claim:

A hydraulic press comprising a series of press pots, a pump for supplying liquid cocoa mass to said press pots, a filling pipe communicating with said pump, said filling pipe being formed of telescoping parts and being movable in the direction of the central axis of the press, an eccentrically mounted shaft disposed parallel to the central axis of the press, branch conduits leading from said filling pipe to said press pots, valve rods, located in said conduits, heads on said valve rods slidable on said eccentrically mounted shaft on the upward and downward movement of the press whereby said valve rods are movable in said branch conduits and serve to open or close said branch conduits simultaneously on rotation of said shaft.

KARL LEIMER.